US012665884B1

(12) United States Patent　　(10) Patent No.:　US 12,665,884 B1
Dice et al.　　(45) Date of Patent:　Jun. 23, 2026

(54) SCALABLE NETWORK INTERFACE INITIATION

(71) Applicant: Dice Corporation, Bay City, MI (US)

(72) Inventors: Clifford V. Dice, Midland, MI (US); Kevin P. Kilborn, Bay City, MI (US)

(73) Assignee: Dice Corporation, Bay City, MI (US)

( * ) Notice: Subject to any disclaimer, the term of this patent is extended or adjusted under 35 U.S.C. 154(b) by 0 days.

(21) Appl. No.: 18/514,779

(22) Filed: Nov. 20, 2023

Related U.S. Application Data

(62) Division of application No. 18/105,556, filed on Feb. 3, 2023, now Pat. No. 11,863,534.

(51) Int. Cl.
　G06F 21/00　　(2013.01)
　H04L 9/40　　(2022.01)
(52) U.S. Cl.
　CPC ...... H04L 63/0421 (2013.01); H04L 63/0272 (2013.01); H04L 63/0281 (2013.01)
(58) Field of Classification Search
　None
　See application file for complete search history.

(56) References Cited

U.S. PATENT DOCUMENTS

| | | | | |
|---|---|---|---|---|
| 7,231,592 B2 * | 6/2007 | Humpleman | ...... | H04N 21/4108 709/219 |
| 7,237,260 B2 * | 6/2007 | Yu | ...... | H04L 63/0272 713/153 |

| | | | | |
|---|---|---|---|---|
| 7,366,188 B2 | 4/2008 | Kim | | |
| 7,813,822 B1 | 10/2010 | Hoffberg | | |
| 8,392,561 B1 | 3/2013 | Dyer et al. | | |
| 8,549,155 B2 | 10/2013 | Skog et al. | | |
| 8,713,669 B2 * | 4/2014 | Guichard | ...... | H04L 63/065 380/278 |
| 8,930,576 B1 * | 1/2015 | Roberts | ...... | H04N 21/25875 704/E15.001 |
| 9,820,155 B2 | 11/2017 | Chen | | |
| 9,871,762 B2 | 1/2018 | Mao | | |
| 10,225,105 B2 | 3/2019 | Dinha et al. | | |
| 10,349,462 B2 | 7/2019 | Altman et al. | | |
| 11,088,948 B1 * | 8/2021 | Talur | ...... | H04L 67/56 |
| 11,527,311 B2 | 12/2022 | Ansari et al. | | |
| 11,722,478 B1 | 8/2023 | White et al. | | |
| 2003/0169730 A1 | 9/2003 | Narasimhan et al. | | |
| 2003/0191848 A1 * | 10/2003 | Hesselink | ...... | H04L 67/14 709/229 |
| 2006/0047742 A1 * | 3/2006 | O'Neill | ...... | H04L 67/63 709/203 |

(Continued)

*Primary Examiner* — Maung T Lwin
(74) *Attorney, Agent, or Firm* — Brooks Kushman P.C.

(57) ABSTRACT

A computer readable medium having non-transitory memory for storing instructions that are to be executed by a computer. The machine instructions when executed by the computer implement the following functions within an application layer to dynamically scale network interfaces: transmitting, at a proxy consumer, a network interface owner request in response to a proxy application programming interface (API) starting the proxy consumer associated with a proxy; transmitting, at the proxy consumer, a proxy request in response to the proxy API starting the proxy consumer associated with the proxy; and receiving, at the proxy consumer, target content after the first and second transmitting functions are performed.

20 Claims, 13 Drawing Sheets

(56) References Cited

U.S. PATENT DOCUMENTS

| | | | |
|---|---|---|---|
| 2007/0234418 A1* | 10/2007 | Song | H04L 12/4641 726/15 |
| 2009/0089871 A1* | 4/2009 | Murphy, Jr. | G06F 21/572 726/11 |
| 2014/0237585 A1* | 8/2014 | Khan | H04L 63/0272 726/15 |
| 2014/0337961 A1 | 11/2014 | Chien et al. | |
| 2014/0344913 A1* | 11/2014 | Stahl | H04L 65/1013 726/11 |
| 2015/0372982 A1 | 12/2015 | Herle et al. | |
| 2016/0087933 A1* | 3/2016 | Johnson | H04L 41/08 709/245 |
| 2016/0255117 A1 | 9/2016 | Sinha et al. | |
| 2016/0277359 A1 | 9/2016 | Karunakaran et al. | |
| 2016/0277374 A1 | 9/2016 | Reid et al. | |
| 2016/0285957 A1 | 9/2016 | Haserodt et al. | |
| 2017/0237601 A1 | 8/2017 | Zhu et al. | |
| 2018/0115523 A1* | 4/2018 | Subbarayan | G06N 20/00 |
| 2019/0173839 A1* | 6/2019 | Lapidous | H04L 12/4641 |
| 2020/0059512 A1 | 2/2020 | Ajodha et al. | |
| 2021/0314411 A1 | 10/2021 | Madden | |
| 2022/0141192 A1 | 5/2022 | Silveira et al. | |
| 2022/0141662 A1 | 5/2022 | Liao | |
| 2022/0247678 A1 | 8/2022 | Atwal et al. | |
| 2022/0247679 A1 | 8/2022 | Andhe | |
| 2022/0303244 A1 | 9/2022 | Wondra et al. | |
| 2023/0254286 A1* | 8/2023 | Work | H04L 63/0272 726/15 |

* cited by examiner

Add Permission Set

Name
Permission Set One

Dealer ▼

610

Dealer * ▼

Cancel                    Next

Add Permission Set

Name
Permission Set One

Type
VPN ▼

Dealer * ▼

612

VPN * ▼

Cancel                    Next

Add Permission Set

Name

602

Type * ▼

604

606
Cancel

608
Finish

600

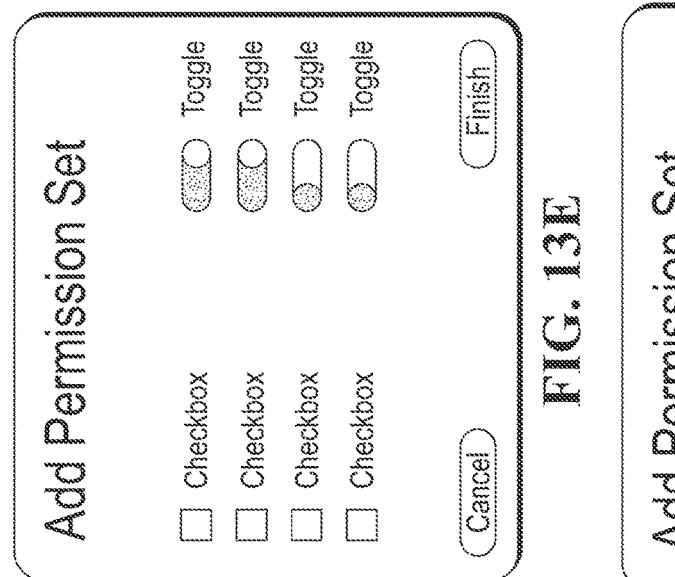
Add Permission Set
Checkbox
Checkbox
Checkbox
Checkbox
Toggle
Toggle
Toggle
Toggle
Cancel    Finish
FIG. 13E
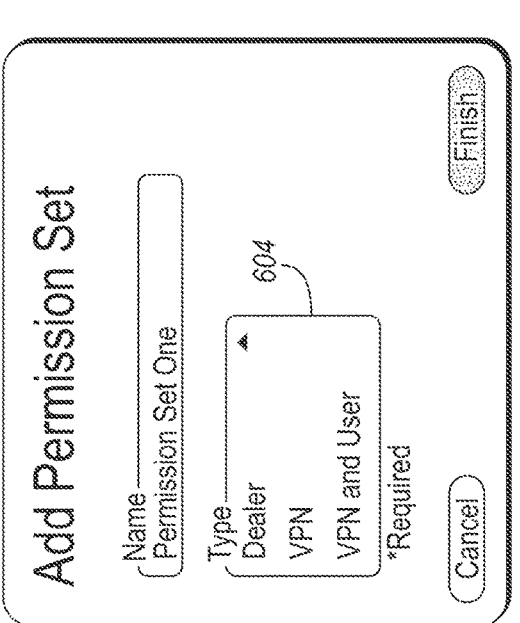
Add Permission Set
Name
Permission Set One
Type
Dealer
VPN
VPN and User
604
*Required
Cancel    Finish
FIG. 13F
Add Permission Set
Name
Permission Set One
Type
VPN and User
Dealer *
VPN *
User *    614
Cancel    Next
600
FIG. 13D

SCALABLE NETWORK INTERFACE INITIATION

CROSS-REFERENCE TO RELATED APPLICATIONS

This application is a divisional of U.S. application Ser. No. 18/105,556 filed Feb. 3, 2023, now U.S. Pat. No. 11,863,534 which issued on Jan. 2, 2024, the disclosure of which is incorporated in its entirety by reference herein.

TECHNICAL FIELD

This invention relates to scalable network interface initiation systems. The network interface may be a virtual private network (VPN).

BACKGROUND

A virtual private network (VPN) is a computer interface used to create a secure and encrypted connection over a public network (e.g., the internet). A VPN is configured to allow access to a private network and share data remotely using a virtual tunnel, which encrypts the transmitted data, thereby providing a secure connection. VPNs are used by businesses to securely access a remote network, protect sensitive data, and/or bypass internet censorship.

SUMMARY

In one embodiment, a computer readable medium having non-transitory memory for storing machine instructions that are to be executed by a computer is disclosed. The machine instructions when executed by the computer implement the following functions within an application layer to dynamically scale network interfaces: transmitting, at a proxy consumer, a network interface owner request in response to a proxy application programming interface (API) starting a proxy consumer associated with a proxy; transmitting, at the proxy consumer, a proxy request in response to the proxy API starting the proxy consumer associated with the proxy; and receiving, at the proxy consumer, target content after the first and second transmitting functions are performed.

In another embodiment, a computer readable medium having non-transitory memory for storing machine instructions that are to be executed by a computer is disclosed. The machine instructions when executed by the computer implement the following functions within an application layer to dynamically scale network interfaces: transmitting, at a proxy consumer, a network interface owner request in response to a proxy application programming interface (API) starting the proxy consumer associated with a proxy. The network interface owner request is associated with a network interface owner with rights to administer and to configure a network interface. The functions further include: transmitting, at the proxy consumer, a proxy request in response to the proxy API starting the proxy consumer associated with the proxy; and receiving, at the proxy consumer, target content after the first and second transmitting functions are performed.

In yet another embodiment, a computer readable medium having non-transitory memory for storing machine instructions that are to be executed by a local computer of a local network is disclosed. The machine instructions when executed by the computer implement the following functions within an application layer to dynamically scale network interfaces to create one or more connections between the local computer and a server: transmitting, at a proxy consumer, a network interface owner request in response to a proxy application programming interface (API) starting the proxy consumer associated with a proxy; transmitting, at the proxy consumer, a proxy request to the proxy API starting the proxy consumer associated with the proxy; and receiving, at the proxy consumer, target content from the server after the first and second transmitting functions are performed.

BRIEF DESCRIPTION OF THE DRAWINGS

FIGS. 13A, 13B, 13C, 13D, 13E, and 13F depict a GUI configured to add a permission set using one or more embodiments disclosed herein.

DETAILED DESCRIPTION

Figure 1:
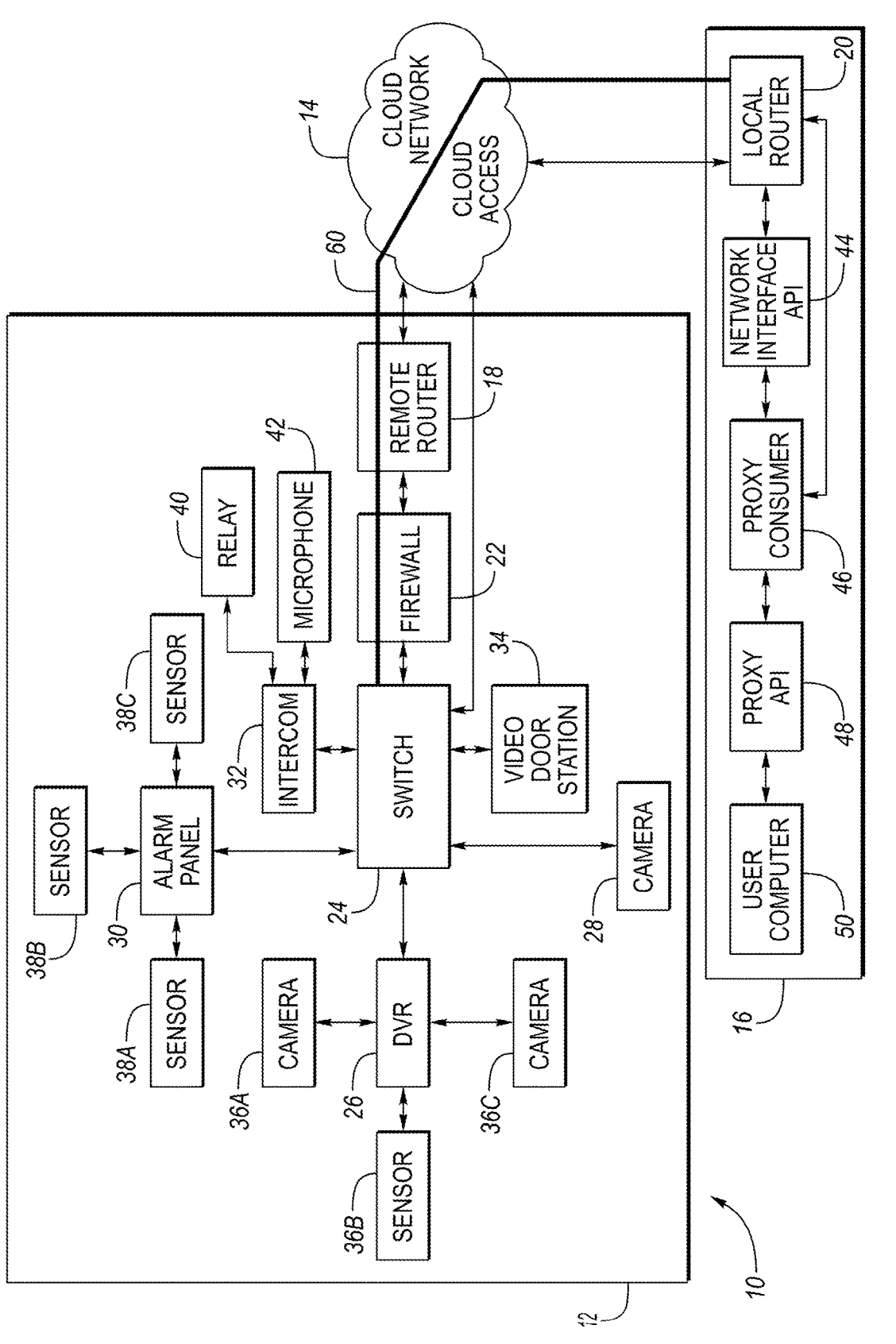
FIG. 1 depicts a computer architecture for a scalable network interface system according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A virtual private network (VPN) extends a private network across a public network and enables users to transmit and receive data across shared or private networks as if the user's computer is directly connected to the private network. Network engineers commonly setup VPN architecture across networks because specialized skills and experience support solving issues that may be encountered when setting up the VPN architecture.

Another route for granting access is internet protocol (IP) whitelisting. IP whitelisting grants access only to specific IP addresses. For example, an authorized user can share a home IP address with a network engineer (e.g., network administrator), who enters the IP address on a whitelist granting network access. While IP whitelisting provides an easy and secure way to access private network resources, whitelisting an IP address may compromise security of a user as well as server reliability for other users.

IP masking may be used to hide a user's IP address from others by replacing it with a different IP address. IP masking may be accomplished using a VPN but doing so has drawbacks. For example, IP masking using a VPN may slow down a user's internet connection. Moreover, IP masking may also make it more difficult to install and set up products based on proxies.

Another networking technique to provide access to network devices and resources is virtual local area networks ("VLAN"). A VLAN may be a broadcast domain partitioned and isolated in a computer network at the data link layer (i.e., the second layer of a seven-layer open system interconnection (OSI) model of computer networking). "Virtual" in VLAN may refer to a physical object recreated and/or altered by additional logic within a local area network. While a VLAN has benefits such as allowing network administrators to automatically limit access to specified user groups by dividing workstations into isolated LAN segments, VLANs may also have one or more drawbacks. For instance, a data packet on a VLAN may leak from a first VLAN to a second VLAN. Data packets may be injected into a VLAN. These injected packets may lead to a cyberattack. The network may require additional routers and may cause interoperability issues.

As described above, achieving accessibility across a network using a VPN involves considerations of openness and isolation (e.g., privacy and security) across the network. For instance, some proposed solutions may provide access to other users of the network, so they have access to each other's traffic and data packets, but this does not achieve isolation. Also, achieving isolation at scale may be difficult due to the manual nature of setting up these VPN infrastructures using network engineers and/or administrators. Masking a considerable number of VPNs together at scale is not feasible using current solutions.

In light of the foregoing, what is needed is a scalable network interface system that addresses one or more of drawbacks identified above. The scalable network interface system of one or more embodiments to dynamically create one to one port networks for scalability while achieving requisite isolation, thereby creating isolation at scale. The system component configured to dynamically create one to one port networks for scalability may be a VPN credentialing module or a portion thereof. The dynamic creation of the networks may use network address translation (NAT) (e.g., NATing directly between the VPN service and a network service). In one or more embodiment, NAT may refer to a mapping of an IP address space into another by modifying network address information in the IP header of packets while the packets are in transit across a traffic routing device.

One or more embodiments of the scalable network interface system may be used to provide network access to network devices behind a firewall of a remote network. The network interface may route between first and second VPNs. The network interface may be configured to control aspects of a domain name system (DNS).

Non-limiting examples of network devices include Internet of Things (IoT) devices, alarm panels, digital video recorders (DVRs), network video recorders (NVRs), network cameras, intercoms, and video door stations. One or more embodiments of the scalable network interface system may be used with commercial and/or residential digital alarm systems. The scalable network interface system may enable access to one or more network devices remotely through cloud-based applications instead of servers installed on premises within a remote network. This enabling technology of one or more embodiments allows programming of each of the scalable network interface connected devices through a web browser. In one or more embodiments, the network interface system may be implemented over a broadband network and/or internet service provider (ISP) IP address network. The scalable network interface network of one or more embodiments may create an encrypted, encapsulated communication path over a network, thereby allowing network management of devices and cybersecurity protections. The network interface data may be automatically embedded into network devices such as cameras.

The logic and/or algorithms of the scalable network interface system of one or more embodiments is built on (and in some embodiments, solely in) the application layer (layer 7) of the OSI model. The logic and/or algorithms in layer 7 may instruct the tunneling to take place at a lower layer (e.g., layer 1, 2 or 3). The application layer may be used by end-user software such as web browsers and email clients. The scalable network interface system may enable proxies used for communication with the network device. Non-limiting examples of proxies include session initiation protocol (SIP) proxy and hypertext transfer protocol secure (HTTPS) proxy. SIP refers to a signaling protocol that enables voice over internet protocol (VOIP) by defining messages sent between endpoints to manage the elements of the call. SIP may be used to support voice calls, video conferencing, instant messaging, and/or media distribution. The enabled proxies may be used to provide access to devices that use the proxies.

The logic and/or algorithms may be built in an operating system, such as Linux or Unix. The operating system may create conflicts by sending multiple routes to the same gateway (e.g., a bridge between first and second networks permitting communication and data transfer therebetween). The layer 7 logic and/or algorithms may be built into a gateway. The layer 7 logic and/or algorithms may be implemented as routing protocols and functions using kernel-based routing within a kernel of the operating system. In one or more embodiments, kernel-based routing is used instead of IP routing performed on packets.

In one or more embodiments, a layer 7 application (e.g., built in Linux) examines the header of a first packet in a transport layer protocol (e.g., transmission control protocol (TCP)) stream without disrupting the rest of the stream.

FIG. 1 depicts computer system 10 configured to initiate and use a scalable network interface system according to one or more embodiments. Computer system 10 includes remote network 12, cloud network 14, and local network 16.

Remote network 12 may be configured to obtain outputs from network devices. These outputs may be used for alarm monitoring and dispatch. As another non-limiting example, the network devices may be IoT devices such as smart refrigerators, lighting systems, thermostats, etc. Cloud network 14 is configured to include one or more remote servers in a cloud computing architecture (e.g., Amazon Web Services (AWS)). Local network 16 may be configured with local computers executing client applications using the outputs obtained from network devices from remote network 12.

Cloud network 14 may be part of the world-wide web or the internet. Cloud network 14 may establish a standard communication protocol between computing devices in remote network 12 and local network 16. Remote network 12 and local network 16 are configured to host server and client computers configured to host a website or webpage from which outputs obtained from network devices of remote server 12 may be obtained.

Remote network 12 includes remote router 18 and local network 16 includes local router 20. Remote router 18 may include a remote network interface and a wired or wireless Ethernet router. Remote router 18 is configured to establish a remote network with one or more servers and/or client computers. Remote router 18 may be further configured to provide a communication interface to cloud network 14. Local router 20 may include a local network interface and a wired or wireless Ethernet router. Local router 20 is configured to establish a local network with one or more servers and/or client computers. Local router 20 may be further configured to provide a communication interface to cloud network 14.

Remote network 12 also includes firewall 22 connected to remote router 18. Firewall 22 is configured to monitor and control network traffic incoming and outgoing from remote router 18. Firewall 22 is configured to create a barrier between a trusted network (e.g., remote network 12) and an untrusted network (e.g., cloud network 14). In one or more embodiments, firewall 22 may be replaced with another network device capable to enable a network interface (e.g., an access point).

Remote network 12 further includes switch 24 connected to firewall 22. Switch 24 is configured to connect network devices of remote network 12 by using packet switching to receive and forward data to a destination (e.g., through firewall 22 and remote router 18 and cloud network 14 to local network 16). Switch 24 may be configured with a multiport network bridge using media access control (MAC) addresses to forward data. The network devices in communication with switch 24 may have unique MAC addresses. Switch 24 may be a SonicWall switch available from SonicGuard.com of Cary, North Carolina. Switch 24 may be directly connected to cloud network 14 (as opposed to indirectly connected to cloud network 14 through firewall 22 and remote router 18) to provide direct cloud access between switch 24 and cloud network 14.

As discussed above, remote network 12 includes network devices. In the embodiment shown in FIG. 1, the network devices include DVR 26, camera 28, alarm panel 30, intercom 32, and video door station 34. While FIG. 1 depicts certain network devices, other network devices may be included within remote network 12. Non-limiting examples of other network devices that may be used in one or more embodiments include artificial intelligence (AI) voice assistants, intelligent lighting systems, learning thermostats, air quality monitors, home voice controllers, and/or mesh Wi-Fi systems.

DVR 26 is configured to receive digital video clips and/or digital video frames from one or more network cameras 36A, 36B, and 36C and transmit these forms of output to switch 24. While DVR 26 is shown as part of remote network 12 on FIG. 1, remote network 12 may also include one or more network video recorders (NVRs). Remote network 12 also includes camera 28 (e.g., a digital camera) configured to transmit digital video clips and/or digital video frames directly to switch 24. DVR 26 and/or one or more NVRs may communicate with switch 24 using a proxy (e.g., an HTTPS proxy).

Alarm panel 30 is configured to receive sensor output from one or more sensors 38A, 38B, and 38C. Alarm panel 30 includes an alarm controller having different channels configured for each specific sensor. The alarm controller is configured to transmit the sensor output to switch 24. The alarm controller may also be configured to transmit alarm alerts in response to the sensor output. Non-limiting examples of one or more sensors 38A, 38B, and 38C include, without limitation, motion detectors (e.g., passive infrared motion detectors), smoke detectors, breakage detectors (e.g., glass break detectors), temperature detectors, ultrasonic detectors, microwave detectors, magnetic switches, photoelectric beams, and gas sensors. Alarm panel 30 may communicate with switch 24 using a proxy (e.g., an HTTPS proxy).

Intercom 32 is configured to transmit data to and/or receive data from relay 40 and microphone 42. Although only a single relay 40 and a single microphone 42 are shown in FIG. 1, multiples of each or both may be included with remote network 12. Intercom 32 is configured to enable two-way communication between people. Intercom 32 may be utilized to grant remote access through an access point of a building or residence (e.g., entry door, garage door, and/or gate). Intercom 32 may be an IP7 intercom and paging amplifier. Relay 40 may be configured to be activated upon entry of a valid code to provide access to a building or residence. Microphone 42 may be configured to translate sound vibrations (e.g., a human voice) into electronic signals that can be broadcast through a speaker and/or recorded to a recording medium.

Video door station 34 is configured to transmit data to and/or receive data from switch 24 of remote network 12. Video door station 34 may include one or more input/output devices such as a button, a microphone, and/or a video camera. Video door station 34 may be configured to provide a digital door bell feature. Video door station 34 and switch 24 may be configured to communicate with each other using a protocol (e.g., SIP protocol).

Computer system 10 also includes local network 16. Local network 16 includes local router 20, VPN application programming interface (API) 44, proxy consumer 46, proxy API 48, and user computer 50. While FIG. 1 depicts these devices/components located on a single local network, these devices/components may be spread across multiple local networks. For example, proxy consumer 46, proxy API 48, and user computer 50 may be on a first local network with a first local router, and VPN API 44 may be on a second local network with a second local router.

User computer 50 may include an alarm monitoring module and an alarm monitoring database. The alarm monitoring module may be configured to display graphical user interfaces (GUIs) on user computer 50. As described below, a user computer may receive data from and transmit data to protected devices using scalable network interfaces in accordance with one or more embodiments. The user of user computer 50 may be a subscriber of alarm services associated with remote network 12. The user may be an operator at a central station or a client site. The alarm monitoring module may be configured to receive digital video clips and/or digital video frames through cloud network 14. The alarm monitoring database may be configured to selectively store digital video clips and/or digital video frames received through cloud network 14.

In one or more embodiments, user computer 50 may include a video client computer application configured for live viewing, control, search and/or playback features for any camera connected to a network. Non-limiting examples of cameras include cameras 28, 36A, 36B, and 36C. Non-limiting examples of a network include the internet. The video client computer application may be physically installed on user computer 50. Alternatively, the video client computer application may be virtually served to user computer 50 using cloud network 14.

Figure 2:
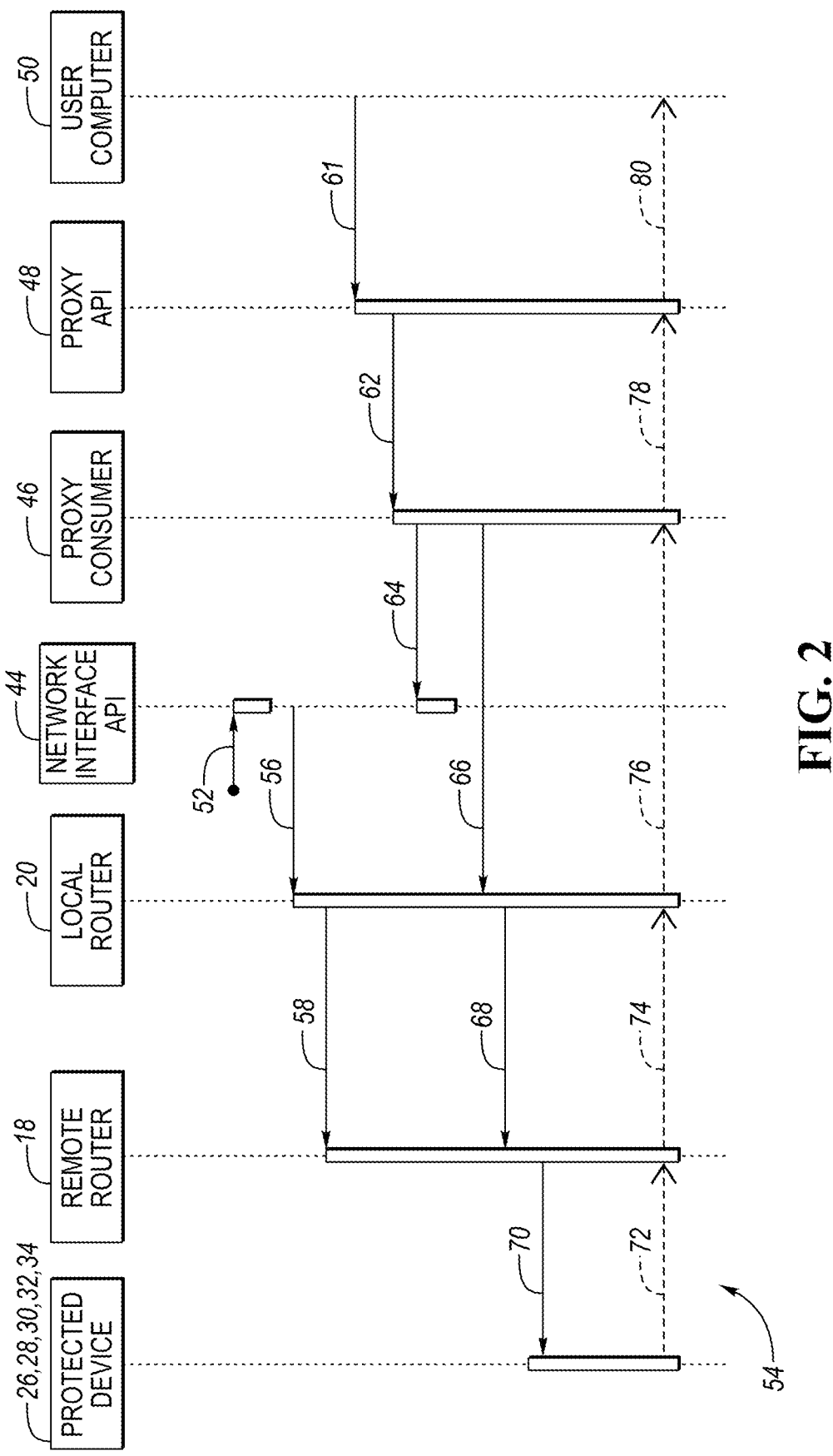
FIG. 2 depicts a sequence diagram of the steps to initiate and access scalable network interfaces according to one embodiment.

FIG. 2 depicts sequence diagram 50 of the steps to initiate and use scalable network interfaces according to one embodiment. In one or more embodiments, the steps to initiate and use scalable network interfaces may be executed using central processing unit (CPU) clock cycles using a low-level programming language (e.g., assembly language). The low-level programming language may be used to directly control the hardware identified in FIG. 2. The CPU clock cycles of user computer 50 may be used to initiate and use scalable network interfaces.

In one or more embodiments, the steps of sequence diagram 50 can be used within the framework of computer system 10 to dynamically scale network interfaces between the resource of local network 16 and one or more protected devices (e.g., DVR 26, camera 28, alarm panel 30, intercom 32, and/or video door station 34). While five (5) potentially protected devices are shown in FIG. 2, the methods and systems of one or more embodiments are capable of scaling thousands of network interfaces dynamically while maintaining isolation and not causing significant degradation of network performance.

Network interface API 44 may be executed on a local computer in local network 16 via web browser software installed physically or virtually on the local computer. Network interface API 44 may be built into the web browser software. The features of network interface API 44 may be provided through the web browser software and/or web apps. Network interface API 44 may be configured to receive and to transmit data and instructions from and to local router 20 and/or proxy consumer 46. Network interface API 44 may utilize features from JavaScript, extensible markup language (XML), dynamic hypertext markup language (DHTML), and/or document object model (DOM).

Proxy consumer 46 may be executed on a local computer in local network 16. Proxy consumer 46 may be configured to create a connection to a server of a web service (e.g., a web service executed on user computer 50). The features of proxy consumer 46 may be provided through web browser software or web apps. Proxy consumer 46 may be configured to receive and to transmit data and instructions from and to network interface API 44, local router 20, and/or proxy API 48.

Proxy API 48 may be executed on a local computer in local network 16 via web browser software installed physically or virtually on the local computer. Proxy API 48 may be built into the web browser software. The features of proxy API 48 may be provided through the web browser software and/or web apps. Proxy API 48 may be configured to receive and to transmit data and instructions from and to user computer 50 and proxy consumer 46. Proxy API 48 may utilize features from JavaScript, extensible markup language (XML), dynamic hypertext markup language (DHTML), and/or document object model (DOM).

In one embodiment, network interface API 44, local router 20, and remote 18 may be used in combination to provide a scalable number of network interfaces (e.g., VPNs) to network devices on remote servers. In one or more embodiments, the network interfaces provide one to one isolated communication paths to network devices at scale without sacrificing security and/or connectivity speed. These individual network interfaces may be used to access data and information output by the network devices. For instance, a first network interface may be established between a first remote network device and a cloud network and/or local network configured to access the first remote network device and data and information output therefrom, and a second network interface may be established between a second remote network device and the cloud network and/or local network.

As depicted in operation 52 of scalable network interface creation/access process 54 as shown in FIG. 2, network interface API 44 receives a network interface request. The network interface request may be received from a device or resource on cloud network 14 and/or local network 16. In one or more embodiments, the network interface request is the first step for establishing a network interface between a network device and on a remote server and a cloud network and/or local server/computer. The network interface request includes one or more identifiers (e.g., identification of a remote router, one or more protected devices, etc.).

As depicted in operation 56 of scalable network interface creation/access process 54 as shown in FIG. 2, network interface API 44 transmits a create network interface command in response to receiving the network interface request. In one or more embodiments, the network interface command is configured to initiate one or more network interface services (e.g., creation of a network interface between a network device on a remote server and a cloud network and/or local server/computer). The network interface command may also be used to generate status information in connection with one or more network interface services. In the embodiment shown in FIG. 2, the network interface command is transmitted to local router 20 residing on local network 16.

As depicted in operation 58 of scalable network interface creation/access process 54 as shown in FIG. 2, local router 20 transmits an establish network interface instruction in response to receiving the create network interface command. In the embodiment shown in FIG. 2, the establish network interface command is transmitted to remote router 18 through cloud network 14. As shown in FIG. 1, network interface communication path 60 is established between switch 24 of remote network 12 and local router 20 of local network 16 as part of the establishment of network interface command. As shown in FIG. 1, network interface communication path 60 extends through cloud network 14, remote router 18, and firewall 22, between switch 24 and local router 20. In one or more embodiments, network interface communication path 60 is established behind firewall 22 of remote network 12. In one or more embodiments, the network interface communication path may extend between a remote router and a virtual router of a cloud network. The virtual router may be a software application hosted in the cloud network and configured with features of hardware routers (e.g., connectivity hot spot, enabling online access, etc.). Network interface communication path 60 is configured to support a scalable number of network interfaces between individual network devices on remote network 12 and cloud network 14 and/or local network 16. Network interface communication path 60 enables one (1) to one (1) communication with individual network devices at scale while maintaining isolation and network connectivity. The individually created network interfaces provide access to network devices by user applications hosted on local network 16 and/or cloud network 14. The individually created network interfaces are configured to simultaneously tunnel through network interface communication path 60. The individually created network interfaces are configured to extend from network interface communication path 60 to an individual protected device (e.g., cameras 36A, 36B, and/or 36C of DVR 26, camera 28, sensors 38A, 38B, and/or 38C of alarm panel 30, relay 40 and/or microphone 42 of intercom 32, and/or video door station 34). Network interface communication path 60 enables direct access between a protected device in user applications hosted by local network 16 and/or cloud network 14, instead of an architecture where such user applications are installed and executed on remote server 12 behind firewall 22.

As depicted by operation 61 of scalable network interface creation/access process 54 as shown in FIG. 2, user computer 50 transmits a proxy request to proxy API 48. The proxy used in the proxy request may be, but is not limited to, a real time streaming protocol (RTSP) proxy, a session initiation protocol (SIP) proxy, and a HyperText Transfer Protocol (HTTP) proxy. The RTSP proxy may be a software application configured to receive RTSP streams (e.g., video clips and video streams) and to make those RTSP streams available to other users. The SIP proxy may be a server configured to manage SIP calls within a network (e.g., process requests from user agents to place and to terminate calls). The HTTP proxy may be a software application configured to filter Web traffic content (e.g., identify suspicious content, viruses, or other intrusions, and protect HTTP servers from attacks).

As depicted by operation 62 of scalable network interface creation/access process 54 as shown in FIG. 2, proxy API 48 starts a proxy consumer in response to receiving a proxy request. The proxy request may be received from user computer 50. The proxy consumer may be used in an application to call or to consume an application (e.g., a web service). Once the proxy consumer is generated, it can be used by applications available on local network 16 and cloud network 14.

As depicted by operation 64 of scalable network interface creation/access process 54 as shown in FIG. 2, proxy consumer 46 transmits a network interface owner request in response to proxy API 48 starting a proxy consumer. As shown on FIG. 2, the network owner request is transmitted to network interface API 44. The network interface owner may have rights to administer and to configure aspects (e.g., all aspects) of the network interface (e.g., a VPN). Network interface API 44 may be configured to transmit data related to the network interface owner to proxy consumer 46 in response to receiving the network interface owner query. The network interface owner data may include owner identification data, network interface administration data, and network interface configuration data.

As depicted by operation 66 of scalable network interface creation/access process 54 as shown in FIG. 2, proxy consumer 46 transmits a proxy request to local router 20 in response to proxy API 48 starting a proxy consumer. In one or more embodiments, the proxy request may include network interface owner data. In one or more embodiments, the proxy request may be transmitted simultaneously with the network interface owner query. In other embodiments, the proxy request may be transmitted after receiving network interface owner data at proxy consumer 46.

As depicted by operation 68 of scalable network interface creation/access process 54 as shown in FIG. 2, local router 20 transmits the proxy request to remote router 18 in response to receiving the proxy request from proxy consumer 46. The proxy request may be transmitted through cloud network 14. As depicted by operation 70 of scalable network interface creation/access process 54 as shown in FIG. 2, remote router 18 transmits the proxy request to a protected device in response to receiving the proxy request from remote router 18.

Operations 61, 62, 64, 66, 68, and 70 may be executed in combination to create a network interface between user computer 50 and a protected device. The created network interface passes through network interface communication path 60. A scalable number of network interfaces, each for an individual, different protected device may tunnel through network interface communication path 60.

Once the scalable network interface has been created, protected device and user computer 50 are configured to communicate through the scalable network interface. For instance, user computer 50 may transmit commands through one or more user software applications through the network interface. User computer 50 may also receive data (e.g., target content) from the protected device through the VPN. As depicted by operation 72 of scalable network interface creation/access process 54 as shown in FIG. 2, target content or other data is transmitted from a protected device to remote router 18. As depicted by operation 74 of scalable network interface creation/access process 54 as shown in FIG. 2, target content or other data is transmitted from remote router 18 to local router 20. As depicted by operation 76 of scalable network interface creation/access process 54 as shown in FIG. 2, target content or other data is transmitted from local router 20 to proxy consumer 46. As depicted by operation 78 of scalable network interface creation/access process 54 as shown in FIG. 2, target content or other data is transmitted from proxy consumer 46 to proxy API 48. As depicted by operation 80 of scalable network interface creation/access process 54 as shown in FIG. 2, target content or other data is transmitted from proxy API 48 to user computer 50.

In one or more embodiments, the protected device may be user computer 50 and the network interface may be used to secure connections at scale to other devices or applications on a network (e.g., on the cloud or remote server remote from user computer 50).

Figure 3:
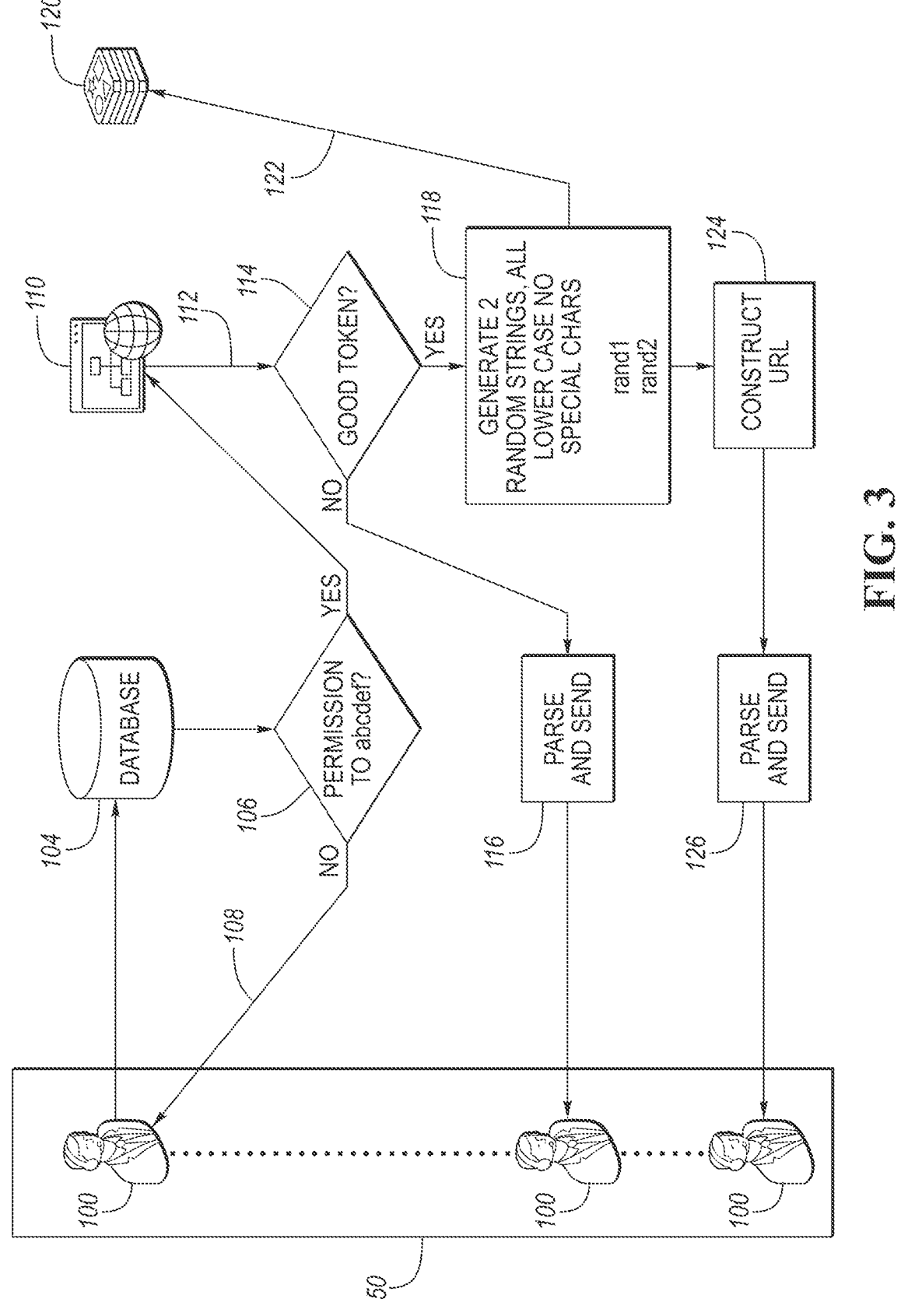
FIG. 3 depicts a sequence diagram of the steps to prepare a subdomain in connection with a scalable network interface according to one embodiment.

FIG. 3 depicts a sequence diagram of the steps to prepare a subdomain in connection with a scalable VPN according to one embodiment. As shown in FIG. 3, user 100, via user computer 50 or other computing device, initiates operation 102 to view an IP address on a VPN (e.g., a scalable VPN according to one or more embodiments). For instance, operation 102 may be referred to as XMVPROXY and the viewing command may be viewing 10.1.1.2:80 on VPN having an identification (ID) abcdef. The ID may identify a client or a customer. Operation 102 checks the VPN ID against database 104 to determine authorization between database 104 of a proxy (e.g., a layer 7 proxy). Decision block 106 determines whether user 100 has permission to the VPN based on the VPN ID. If user 100 does not have permission to the VPN having the VPN ID abcdef, then user 100 receives a forbidden message as represented by arrow 108.

If user 100 has permission to the VPN having the VPN ID abcdef, a POST URL, TOKEN, IP, and PORT are generated in response to the VPN ID abcdef (e.g., NETID) as depicted in operation 110. In one non-limiting example, the POST URL is https://customer-name-securemcloud.com/proxy, the TOKEN is WXYZ, the IP is 10.1.1.2, and the PORT is 80.

As shown by arrow 112, the TOKEN is passed to decision block 112. Decision block 114 determines if the TOKEN is a good token. If the TOKEN is not a good token, then the bad TOKEN is sent to operation 116. Operation 116 parses the bad TOKEN and sends it to user 100 operating on computer 50 or other computing device.

If TOKEN is a good token, then operation 118 is performed. In one embodiment, operation 118 generates two (2) random strings where the random strings include all lower case letters with no special characters. In other embodiments, the random strings may include special characters. In the example shown in FIG. 3, the random strings are assigned variable rand1 and rand2. The HSET command may be used to create a hash from rand1 and an endpoint. Along with the HSET endpoint: rand1, TOKEN rand2, NETID abcdef, IP 10.1.1.2, and/or PORT 80 may be transmitted to device 120 as shown by arrow 122. The HSET command is a Redis (Remote Dictionary Server) command used to set the value of a field in a hash stored at a key.

As shown in operation 124, rand1 and rand2 are used to construct a URL. For example, the URL may be https:// rand1.mivapps.customer-name.securemcloud.com/proxy-auth/rand2. The URL may be sent to operation 126, which parses the URL and sends it to user 100.

Figure 4:
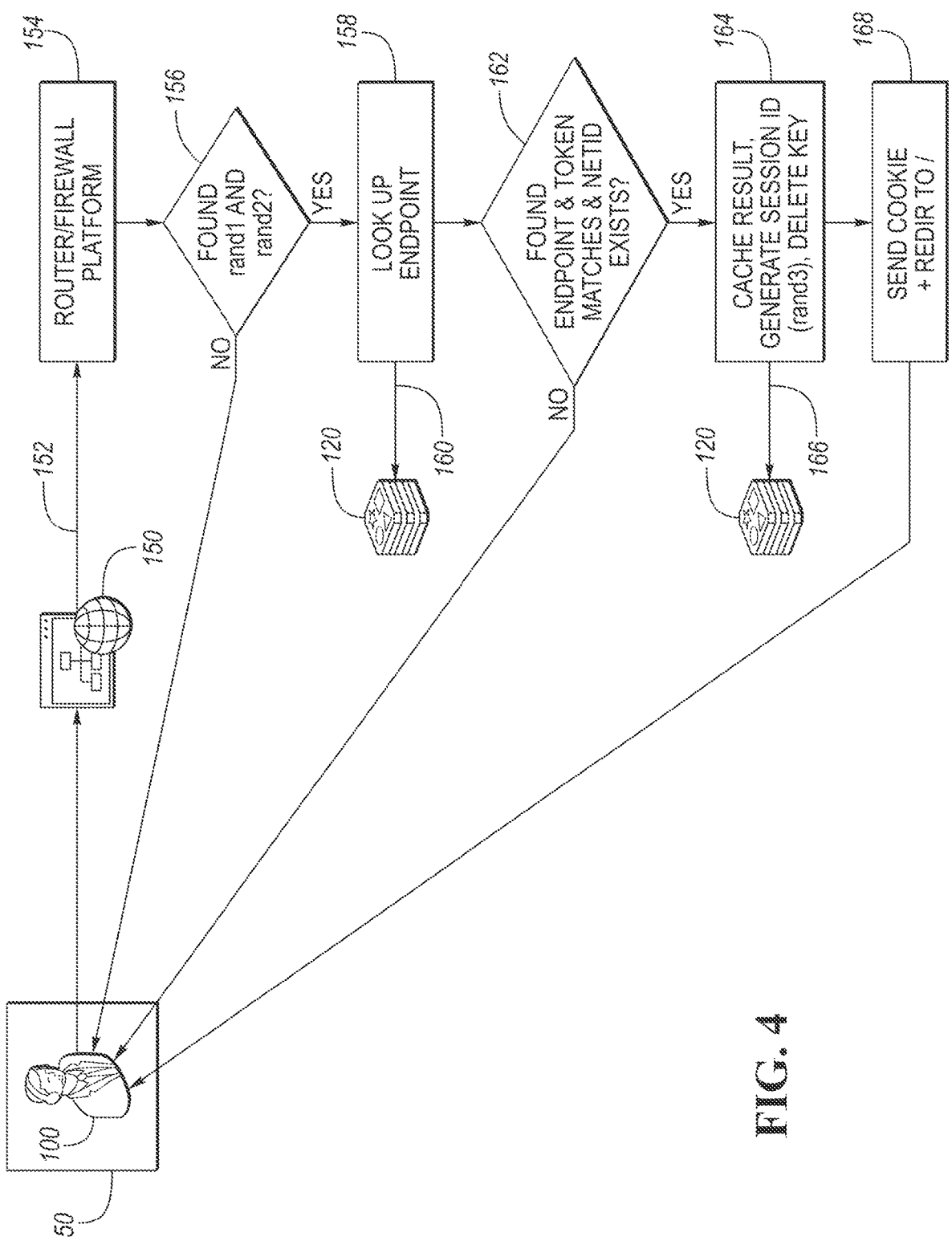
FIG. 4 depicts a sequence diagram of the steps to obtain a cookie in connection with a scalable network interface according to one embodiment.

FIG. 4 depicts a sequence diagram of the steps to obtain a cookie in connection with a scalable VPN according to one embodiment. As shown in FIG. 4, the URL constructed by operation 124 (e.g., https://rand1.mivapps.customer-name.securemcloud.com/proxyauth/rand2) is transmitted to operation 150 by user 100. At operation 150, an HAProxy command (or other command to configure or manage the behavior of the proxy server) is configured to do a TLS (transport layer security) termination for * mivapps.customer-name.securemcloud.com. TLS is a protocol used by applications to communicate securely across a network, resisting tampering with messaging (e.g., email), web browsing, and other protocols. The termination may also be performed on a secure sockets layer (SSL).

As shown by arrow 152, the URL is sent to a router/firewall platform 154. The router/firewall platform 154 may be executed on local router 20. The router/firewall platform 154 may also be executed on remote router 18 and firewall 22. The router/firewall platform 154 may execute an open-source network operating system. Along with the URL, other information may be transmitted to router/firewall platform 154 (e.g., VPN ID abcdef, a POST URL, TOKEN, IP, PORT, rand1, and rand2). Router/firewall platform 154 may be configured to determine horizontal scaling needs for provisioning additional cloud servers. The horizontal scaling may split workloads between servers to limit the number of requests any individual server is receiving. Horizontal scaling may add additional instances to support additional VPNs, thereby making one or more embodiments configured to provide scalable cloud-based VPNs.

As shown in decision block 156, the information transmitted to router/firewall platform 154 is searched to find rand1 and rand2. If rand1 and rand2 are not found, then access to the VPN is forbidden and a message to this affect is transmitted to user 100. If rand1 and rand2 are found, then control is passed to operation 158. Operation 158 is configured to look up the endpoint associated with rand1. As shown by arrow 160, an HMGET endpoint: rand1 command is executed to obtain the endpoint from device 120.

As shown in decision block 162, the result of the endpoint look up operation 158 is transmitted to decision block 162 along with other information passed through the sequence loop (e.g., VPN ID abcdef, a POST URL, TOKEN, IP, and PORT). Decision block 162 determines if the endpoint was found and whether the TOKEN matches and a VPN ID exists. If all these are not true, then access to the VPN is forbidden and a message to this affect is transmitted to user 100. If all these are true, then control is passed to operation 164.

Operation 164 is configured to cache the results of previous decisions and/or operations (e.g., operation 154, decision block 156, operation 158, and decision block 162). The results may be cached using Redis software or other in-memory data structure store, used as a distributed, in-memory key-value database, cache, and message broker. Operation 164 may also be configured to generate a session ID. The session ID may be a third random string including all lower case letters with no special characters. The third random string may be referred to as rand3. Operation 164 may be further configured to delete the endpoint: rand1 key. As depicted by arrow 166, the DEL endpoint: rand1 operation is transmitted to device to delete the key.

Operation 168 is configured to transmit a cookie (e.g., to user computer 50) and to perform a redir command to "/" (e.g., user computer 50). In one or more embodiments, the redir command in Linux is configured to redirect input or output from a command to a file or another device. The redir command may redirect transmission control protocol (TCP) connections coming into a local port to a specified address and port combination. The URL associated with operation 168 may be https:// rand1.mivapps.customer.name.securemcloud.com. The set-cookie command may be performed by the command sid=rand3.

Figure 5:
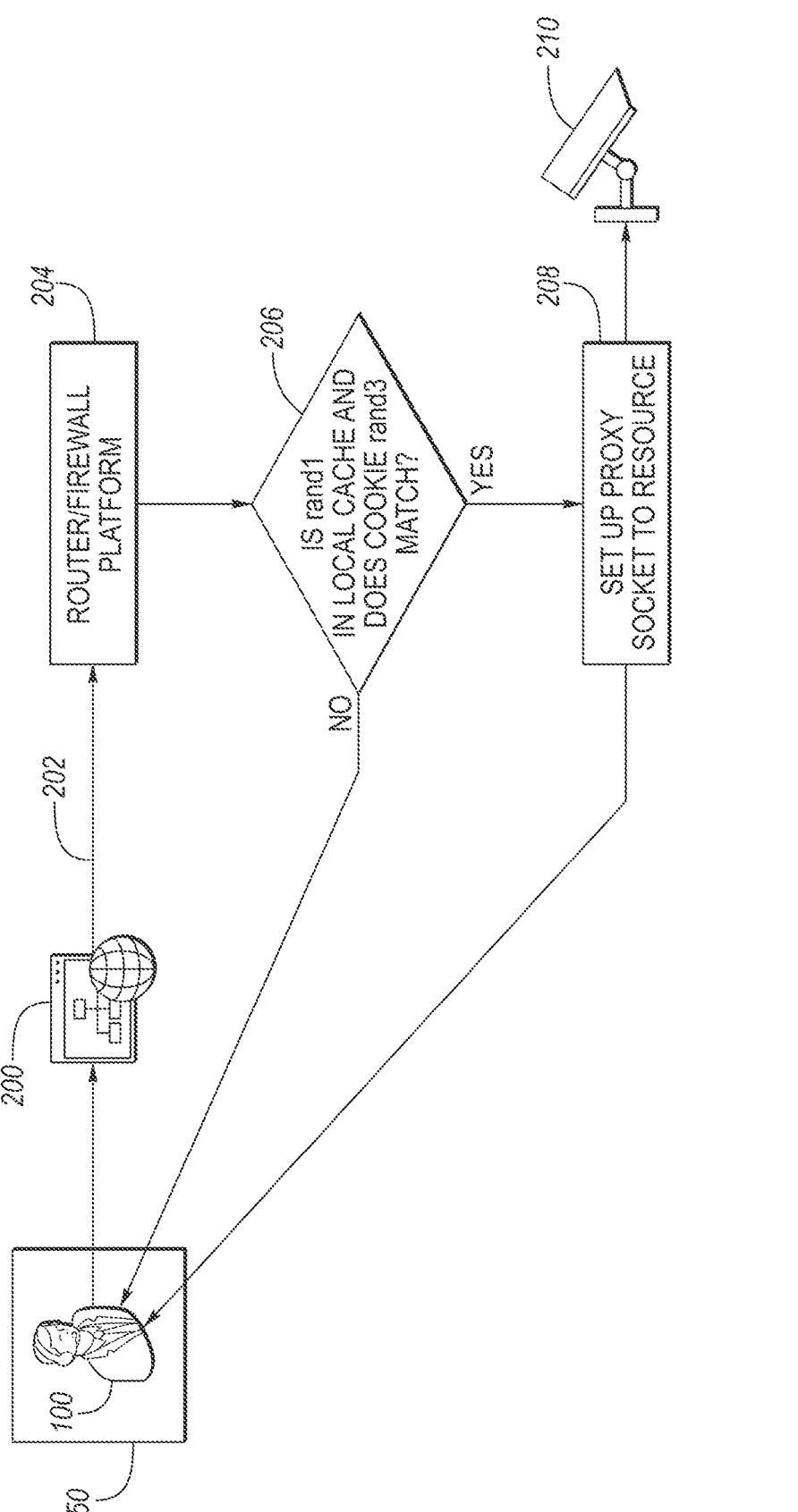
FIG. 5 depicts a sequence loop for consuming a proxy resource (e.g., a HTTP proxy resource) in connection with a scalable network interface according to one embodiment.

FIG. 5 depicts a sequence loop for consuming a proxy resource (e.g., a HTTP proxy resource) in connection with a scalable VPN according to one embodiment. As shown in FIG. 5, user 100 transmits the redir command URL (e.g., https.//rand 1.mivapps.customer-name.securemcloud.com) and the cookie SID command (e.g., cookie sid=rand3) to operation 200. At operation 200, an HAProxy command is configured to do a TLS termination for *. mivapps.customer-name.securecloud.com.

As shown by arrow 202, the redir command website is sent to a router/firewall platform 204. The router/firewall platform 204 may be executed on local router 20. The router/firewall platform 204 may also be executed on remote router 18 and firewall 22. The router/firewall platform 204 may execute an open source network operating system. Along with the redir command URL, other information may be transmitted to router/firewall platform 204 (e.g., VPN ID abcdef, a POST URL, TOKEN, IP, PORT, rand1, and rand2). Router/firewall platform 204 may be configured to determine horizontal scaling needs for provisioning additional cloud servers. The horizontal scaling may split workloads between servers to limit the number of requests any individual server is receiving. Horizontal scaling may add additional instances to support additional VPNs, thereby making one or more embodiments configured to provide scalable cloud-based VPNs.

As shown in decision block 206, decision block 206 determines whether rand1 is in local cache and whether cookie rand3 matches. If either of these conditions is false, then access to the VPN is forbidden and a message to this affect is transmitted to user 100. If both these conditions are true, then control is passed to operation 208.

Operation 208 is configured to set up a proxy socket to a resource (e.g., video camera resource 210 or other protected device) in response to determining rand1 is in local cache and cookie rand3 matches. Operation 208 may also be configured to transmit proxied data to user 100.

Figure 6:
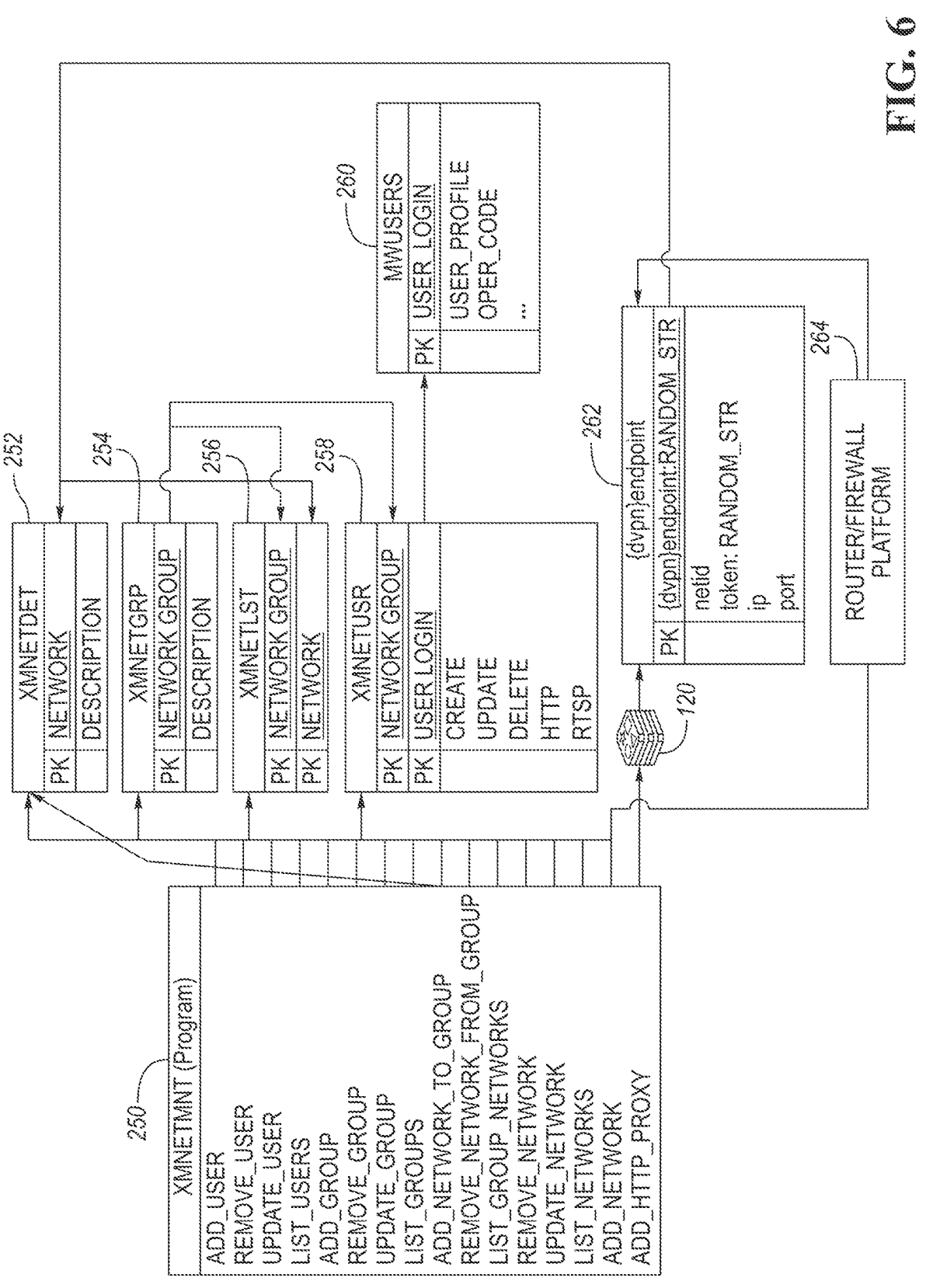
FIG. 6 depicts a data structure of a user application for maintaining scalable network interfaces according to one embodiment.

FIG. 6 depicts data functions of a user application for maintaining scalable VPNs according to one embodiment. According to the data functions shown in FIG. 6, networks may be added to one or more groups. The users may be assigned permissions to one or more network groups. In one or more embodiments, users with unlimited permissions may access any network. The data structure includes XMNETMNT (Program) data functions table 250, XMNET-DET data functions table 252, XMNETGRP data functions table 254, XMNETLST data functions table 256, XMNE-TUSR data functions table 258, and MWUSERS data functions table 260.

As shown in FIG. 6, XMNETMNT (Program) data functions table 250 includes the following data functions: ADD_USER, REMOVE_USER, UPDATE_USER, LIS-T_USERS, ADD_GROUP, REMOVE_GROUP, UPDAT-E_GROUP, LIST_GROUPS, ADD_NETWORK_ TO_GROUP, REMOVE_NETWORK_FROM_GROUP, LIST_GROUP_NETWORKS, REMOVE_NETWORK, UPDATE_NETWORK, LIST_NETWORKS, ADD_NET-WORK, and ADD_HTTP_PROXY. In one or more embodiments, the functions in data functions table 250 may be modified, deleted, and/or supplemented depending on the implementation of cloud scalable VPNs.

The data from one or more of the functions in data functions table 250 may be transmitted to device 120. Device 120 is configured to perform the functions shown in functional block 262 relating to {dvpn} endpoint. As shown in FIG. 6, the functions include {dvpn} endpoint: RAN-DOM_STR including netid, token: RANDOM_STRING, ip, and port. These functions may be used to generate the VPN ID, TOKEN, IP and PORT as referred to in FIGS. 3 to 5.

The data from one or more of the functions in data functions table 250 may be transferred to router/firewall platform 264 for horizontal scaling purposes. Router/fire-wall platform 264 may be configured to utilize the data and transmit resulting data to functional block 262.

As shown in FIG. 6, XMNETDET data functions table 252 includes the following data functions: NETWORK DESCRIPTION. As shown in FIG. 6, XMNETGRP data functions table 254 includes the following data functions: NETWORK GROUP DESCRIPTION. As shown in FIG. 6, XMNETLST data functions table 256 includes data associ-ated with the NETWORK DESCRIPTION and NET-WORK_GROUP_DESCRITPION. In one or more embodi-ments, the functions in data functions table 256 may be modified, deleted, and/or supplemented depending on the implementation of cloud scalable VPNs.

As shown in FIG. 6, XMNETUSR data functions table 258 includes the NETWORK_GROUP DESCRIPTION and USER_LOGIN functions (e.g., CREATE, UPDATE, DELETE, HTTP, and RTSP). MWUSERS data functions table 260 includes USER_LOGIN functions such as USER_PROFILE and OPER_CODE. Data from XMNE-TUSR data functions table 258 is used by MWUSERS data functions table 260. In one or more embodiments, the functions in data functions table 258 may be modified, deleted, and/or supplemented depending on the implemen-tation of cloud scalable VPNs.

Figures 7A, 7B:
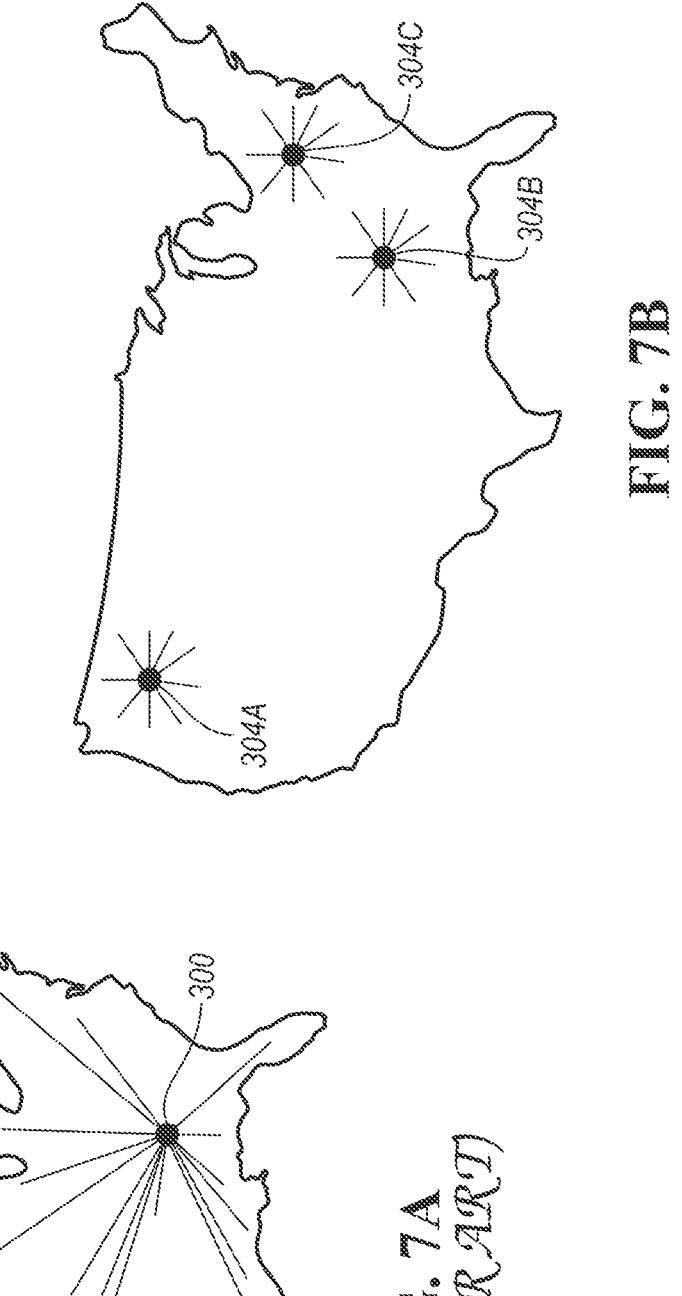
FIG. 7A depicts a prior art digital video alarm system where digital video alarm system monitoring software is hosted on premises by a company that performs monitoring services.
FIG. 7B depicts an architecture utilizing cloud scalable VPNs of one or more embodiments disclosed herein.

FIGS. 7A and 7B depict schematic views of implemen-tations of a digital video alarm system. FIG. 7A depicts a prior art digital video alarm system where digital video alarm system monitoring software is hosted on premises by a company that performs monitoring services. The digital video alarm system monitoring software is hosted on hard-ware located on site.

As shown in FIG. 7A, hardware 300 is located on site at the monitoring company. Hardware 300 hosts alarm moni-toring software. The alarm monitoring software hosted by local hardware 300 is configured to communicate with sites through communication paths 302. Hardware 300 resides behind a firewall. Because the alarm monitoring software is located behind a firewall, setting up VPN architecture across the networks represented by communication paths 302 is commonly performed by network engineers given the com-plexity of solving issues that may be encountered when setting up the VPN architecture.

As opposed to the architecture shown in FIG. 7A, FIG. 7B depicts an architecture utilizing cloud scalable VPNs of one or more embodiments disclosed herein. As shown in FIG. 7B, cloud based alarm monitoring software is hosted on cloud servers 304A, 304B, and 304C. Each of the commu-nication paths extending from cloud servers 304A, 304B, and 304C may be VPNs initiated using one or more embodi-ments disclosed herein. The use of cloud scalable VPNs enables load balancing between cloud resources and pro-tected devices and provides fail over mechanism that can be implemented within the cloud without the need to fix hardware on site.

The protected devices of one or more embodiments may have a backdoor granting access to unauthorized systems and/or individuals. These backdoors may be disabled by the creation of the scalable VPNs of one or more embodiments disclosed herein. If an unauthorized system or individual attempts to attack one of the protected devices, the potential hacker is presented a mirror and wall with full encryption. Therefore, the potential hacker is given no access to the device itself. These safeguards are enabled by security keys that can be changed frequently (e.g., on the order of sec-onds).

Figure 8:
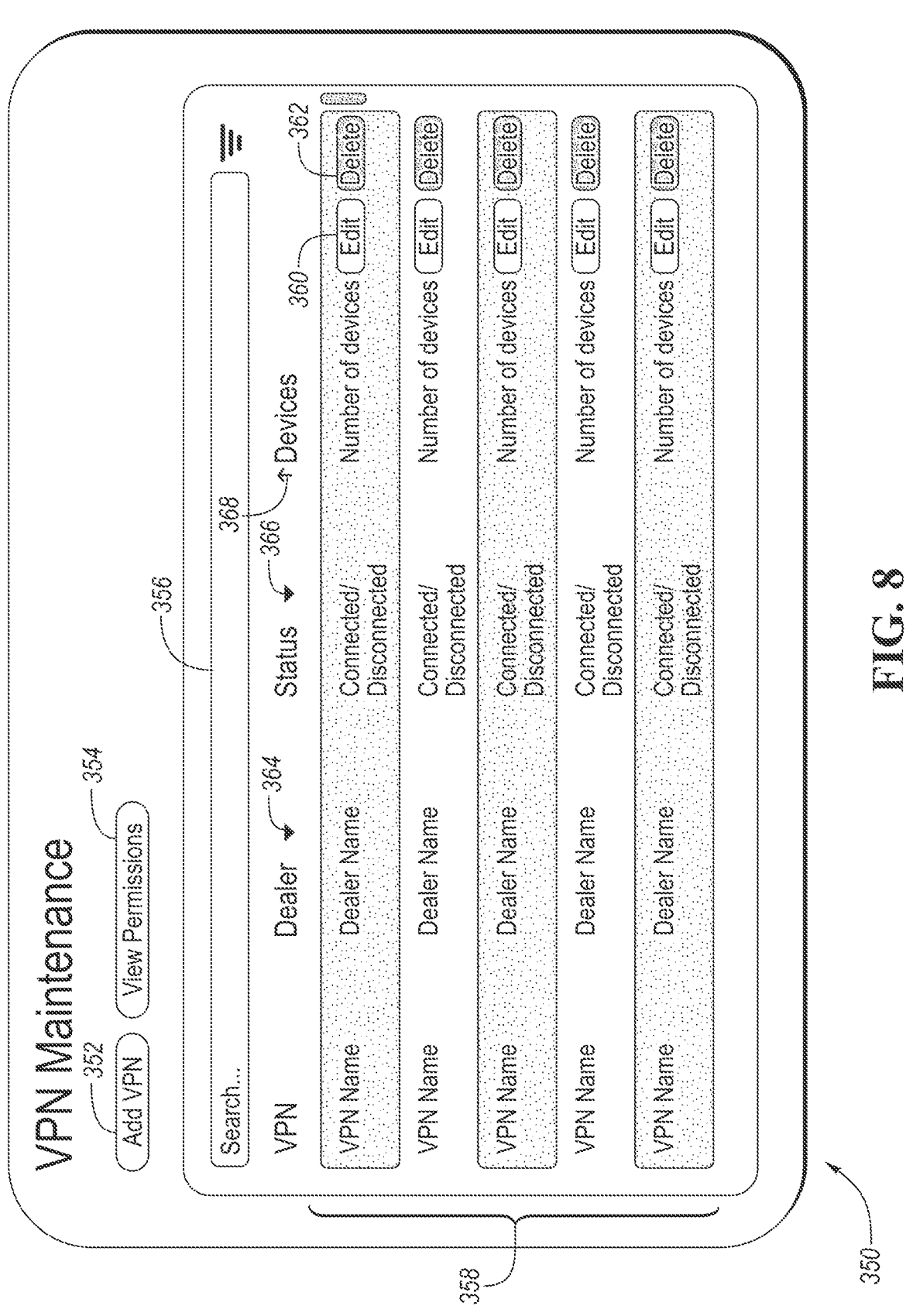
FIG. 8 depicts a graphical user interface (GUI) configured to perform VPN maintenance functions and to display VPN maintenance information using one or more embodiments disclosed herein.

FIG. 8 depicts graphical user interface (GUI) 350 con-figured to perform VPN maintenance functions and to dis-play VPN maintenance information using one or more embodiments disclosed herein. The VPNs displayed on GUI 350 may be VPNs initiated by the cloud scalable VPN processes and systems of one or more embodiments. GUI 350 includes add VPN button 352, view permissions 354, search field 356, and VPN information display 358. VPN information display 358 includes VPN name, dealer, status (e.g., connected or disconnected), and number of devices columns. VPN information display 358 includes rows dis-playing a VPN name, a dealer name associated with the VPN name, a status of the VPN, and a number of devices connected to the VPN. The rows also include an edit button 360 configured to edit the information displayed in the respective row upon selection and a delete button 362 configured to delete the VPN in the respective row upon selection. Upon selecting the delete button 362, a window is displayed to confirm the deletion of the VPN. The deletion confirmation window may include the phrase "Are you sure you want to permanently delete VPN name? This action cannot be undone." The dealer and status columns include drop down box selection arrows 364 and 366, respectively. In response to selecting drop down box selection arrow 364, a window is displayed with a search field configured to search for dealer names entered into the system. A dealer name from the dealer names returned by the search may be selected using a radio button. In response to selecting drop down box selection arrow 366, a window is displayed with a toggle button to select between connected and disconnected. A user may toggle between an up arrow and down arrow associated with the number of devices column to sort the VPN names based on the lowest and highest number of devices, respectively, associated with the VPNs. FIG. 8 shows an up arrow 368 associated the number of devices column.

Figures 9A, 9B, 9C, 10:
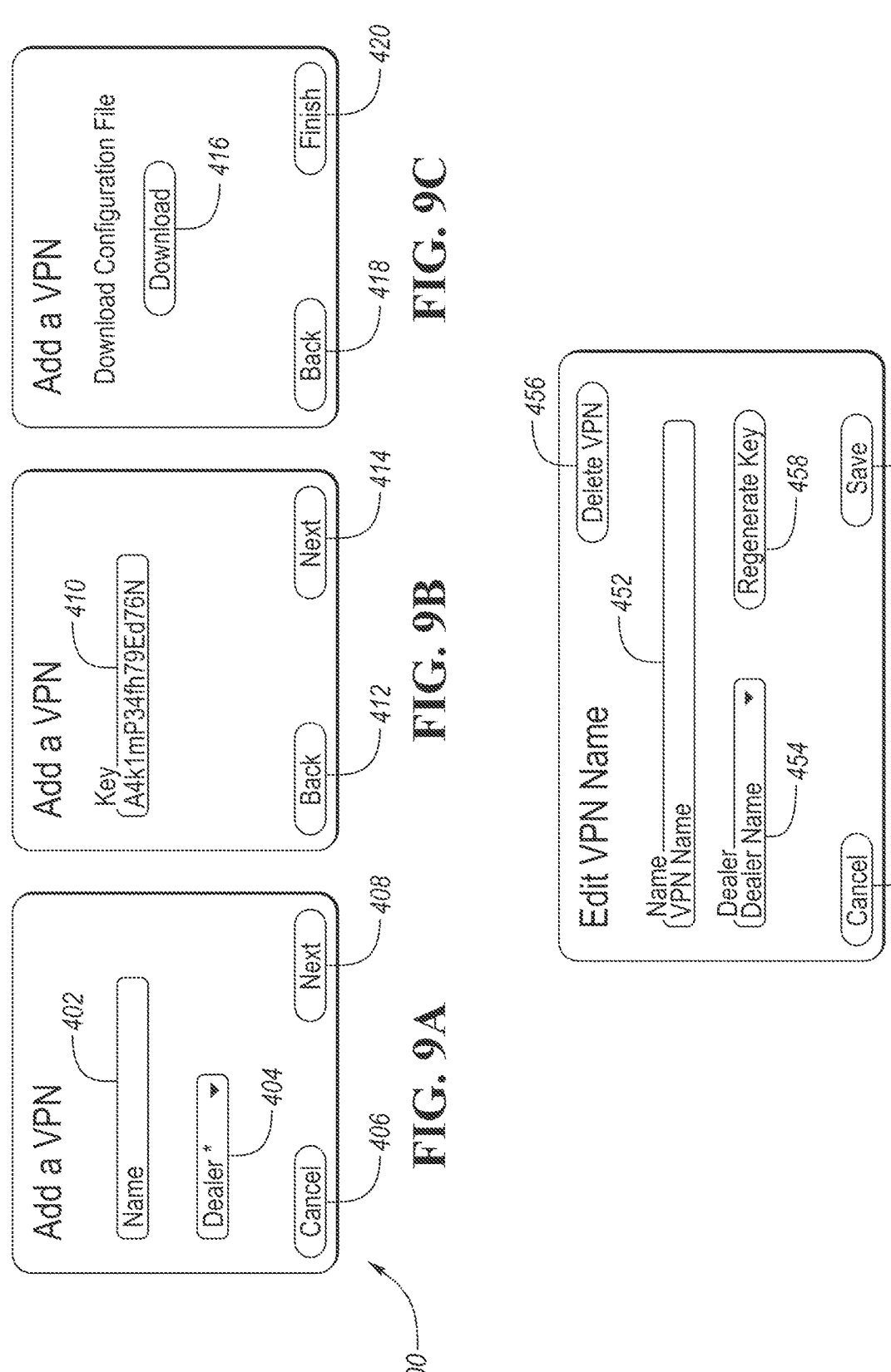
FIGS. 9A, 9B, and 9C depict a GUI configured to add a VPN using one or more embodiments disclosed herein.
FIG. 10 depicts a GUI configured to edit a VPN using one or more embodiments disclosed herein.

FIGS. 9A, 9B, and 9C depict GUI 400 configured to add a VPN using one or more embodiments disclosed herein. GUI 400 may be displayed upon selecting add VPN button 352 from GUI 350. GUI 400 includes a name field 402 configured to receive input of a VPN name, a dealer drop down menu 404 configured to receive input from a user of a dealer name, a cancel button 406 to cancel the process of creating a VPN, and a next button 408 configured to display the next GUI in the add the VPN sequence. As shown in FIG. 9B, key entry field 410 is displayed for entering a security key associated with the VPN to be created. The key may be generated by VPN creation/access process 54 using one or more identifiers (e.g., identification of a remote router, one or more protected devices, etc.). The key may be transmitted to the user so that the user may enter the key into the key entry field 410. GUI 400, as depicted in FIG. 9B, also includes back button 412 configured to switch to GUI 400 as shown in FIG. 9A upon selection. After entry of the key, next button 414 may be selected to advance to the next step in the add VPN process carried out using GUI 400. As shown in FIG. 9C, after the entered key is accepted by VPN creation/access process 54, VPN creation/access process 54 generates a configuration file configured to be downloaded using download button 416. GUI 400, as depicted in FIG. 9C, also includes back button 418 configured to switch to GUI 400 as shown in FIG. 9B upon selection. After downloading the configuration file using download button 416, the user can select the finish button 420 to finish the add VPN process.

FIG. 10 depicts GUI 450 configured to edit a VPN using one or more embodiments disclosed herein. GUI 450 includes VPN name entry field 452 configured to accept the name of a VPN within the database. GUI 450 includes dealer drop down box 454 configured for selecting a dealer name associated with the selected VPN name. GUI 450 includes a delete VPN button 456, which upon selection, deletes the selected VPN. The regenerate key button 458 is configured to regenerate a key for the selected VPN name and dealer name combination. The cancel button 460 may be selected to cancel out of the edit VPN GUI 450. The save button 462 may be selected to save the entered VPN name and the selected dealer name.

Figure 11:
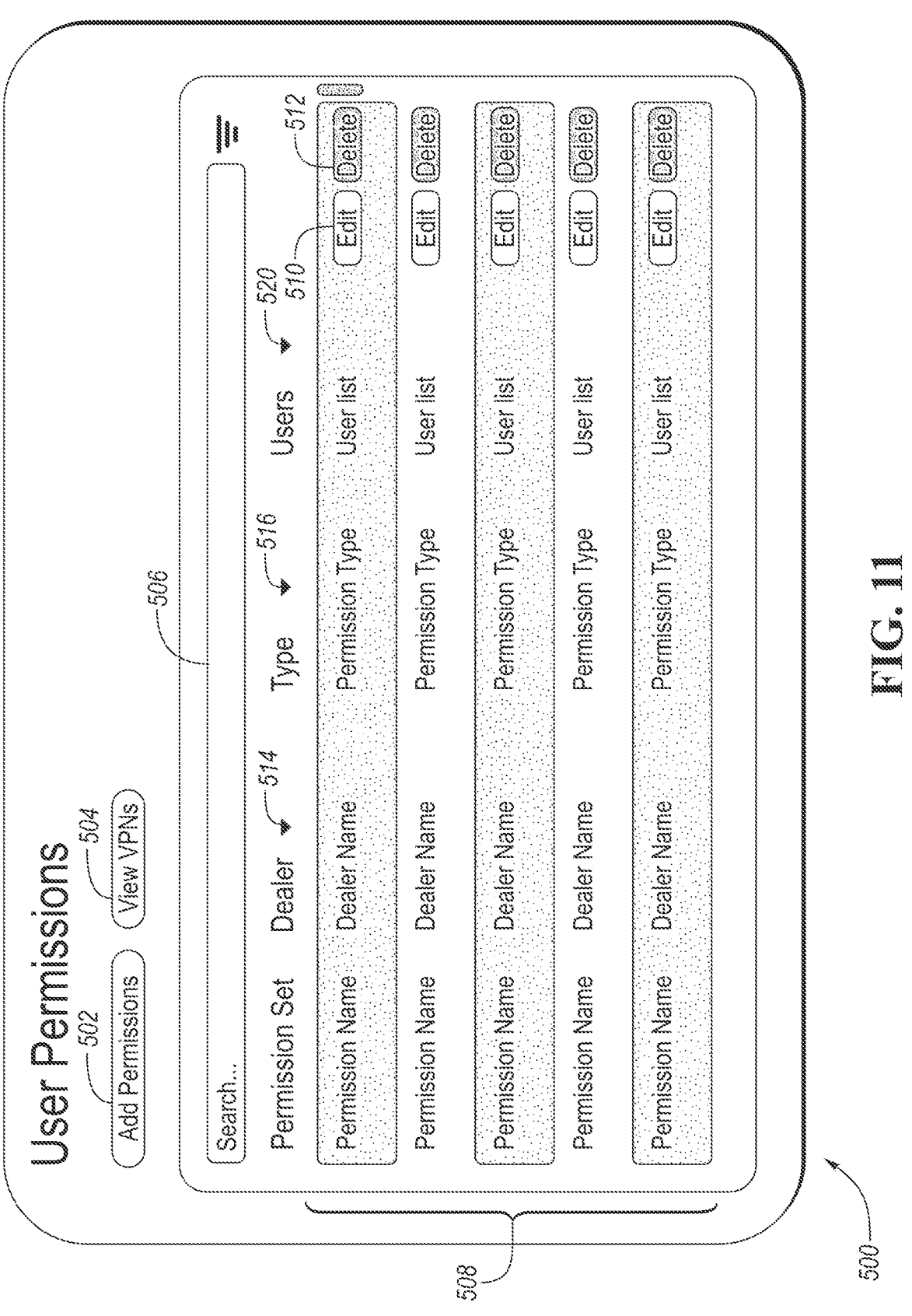
FIG. 11 depicts a GUI configured to perform user permission functions and to display permission set information using one or more embodiments disclosed herein.

FIG. 11 depicts GUI 500 configured to perform user permission functions and to display permission set information using one or more embodiments disclosed herein. GUI 500 may be displayed upon selecting the view permissions button 354 of GUI 350. GUI 500 may be used to add and edit permissions that users have to particular VPNs. GUI 500 includes add permissions button 502, view VPNs button 504, search field 506, and permission information display 508. Permissions information display 508 includes permission set, dealer name, permission type, and user list columns. Permissions information display 508 includes rows displaying a permission name, a dealer name associated with the permission name, a permission type associated with the permission name, and a user list associated with the permission name. The rows also include an edit button 510 configured to edit the information displayed in the respective row upon selection and a delete button 512 configured to delete the permission set in the respective row upon selection. Upon selecting the delete button 512, a window is displayed to confirm deletion of the permission set. The deletion confirmation window may include the phrase "Are you sure you want to permanently delete Permission Set? This action cannot be undone." The dealer, type, and user columns include drop down box selection arrows 514, 516, and 518, respectively. In response to selecting drop down box selection arrow 514, a window is displayed with a search field configured to search for dealer names entered into the system. A dealer name from the dealer names returned by the search may be selected using a radio button. In response to selecting drop down box selection arrow 516, a window is displayed with a toggle button to select between dealer, VPN, and VPN/user. In response to selecting drop down box selection arrow 518, a window is displayed with a search field configured to search for user names entered into the system. A user name from the user names returned by the search may be selected using a radio button.

Figure 12:
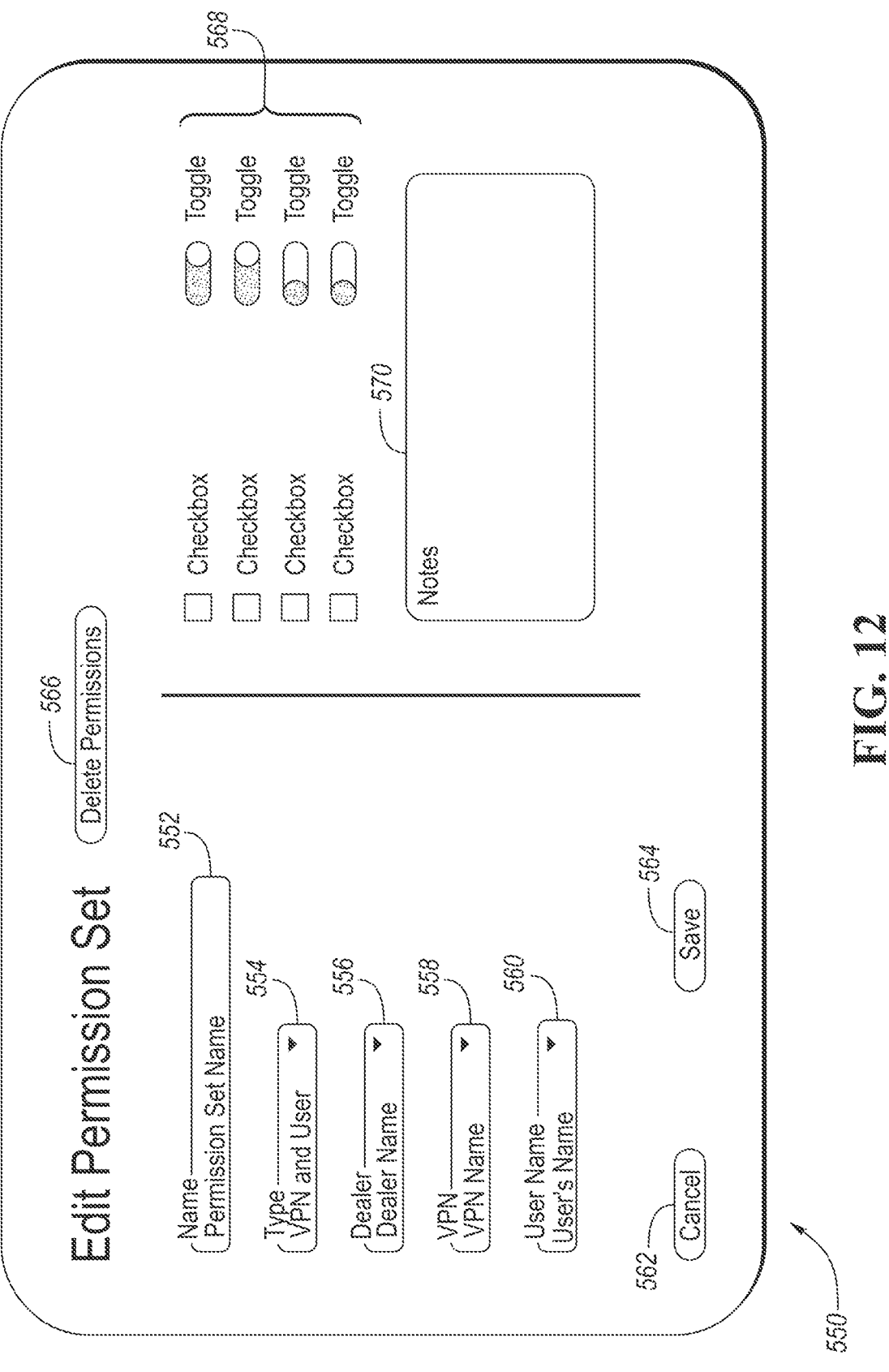
FIG. 12 depicts a GUI configured to edit a permission set using one or more embodiments disclosed herein.

FIG. 12 depicts GUI 550 configured to edit a permission set using one or more embodiments disclosed herein. GUI 550 includes name input field 552 configured to receive an input of a permission set name. GUI 550 also includes a permission type drop down box 554, a dealer drop down box 556, a VPN drop down box 558, and a user name drop down box 560. Upon selecting permission type drop down box 554, a drop down box is displayed with a toggle button to select between dealer, VPN, and VPN/user. As shown on FIG. 12, the permission type drop down box 554 defaults to the current permission type associated with the permission set name. Upon selecting dealer drop down box 556, a window is displayed with the possible choices for the dealer name for selection by a user. As shown in FIG. 12, the dealer drop down box 556 defaults to the current dealer associated with the permission set name. Upon selecting VPN drop down box 558, a window is displayed with the possible choices for VPN name for selection by a user. As shown in FIG. 12, the VPN drop down box 558 defaults to the current dealer associated with the permission set name. Upon selecting user name drop down box 560, a window is displayed with the possible choices for user name for selection by a user. As shown in FIG. 12, the user name drop down box 560 defaults to the current user name associated with the permission set name. Cancel button 562 may be selected to cancel the current changes made to a permission set through the permission type drop down box 554, the dealer drop down box 556, the VPN drop down box 558, and the user name drop down box 560. Save button 564 may be selected to save the current changes made to a permission set through the permission type drop down box 554, the dealer drop down box 556, the VPN drop down box 558, and the user name drop down box 560. Delete permissions button 566 may be selected to delete the existing permissions associated with the permission set. GUI 550 includes checkboxes and associated toggle buttons in region 568. A checkbox may be associated with a tag or characteristic associated with a permission set and the associated toggle button may be used to associate a value with the tag or characteristic. GUI 550 also includes a notes area 570 for entering notes associated with the entered permission set.

FIGS. 13A, 13B, 13C, 13D, 13E, and 13F depict GUI 600 configured to add a permission set using one or more

US 12,665,884 B1

Figures 13A, 13B, 13C:
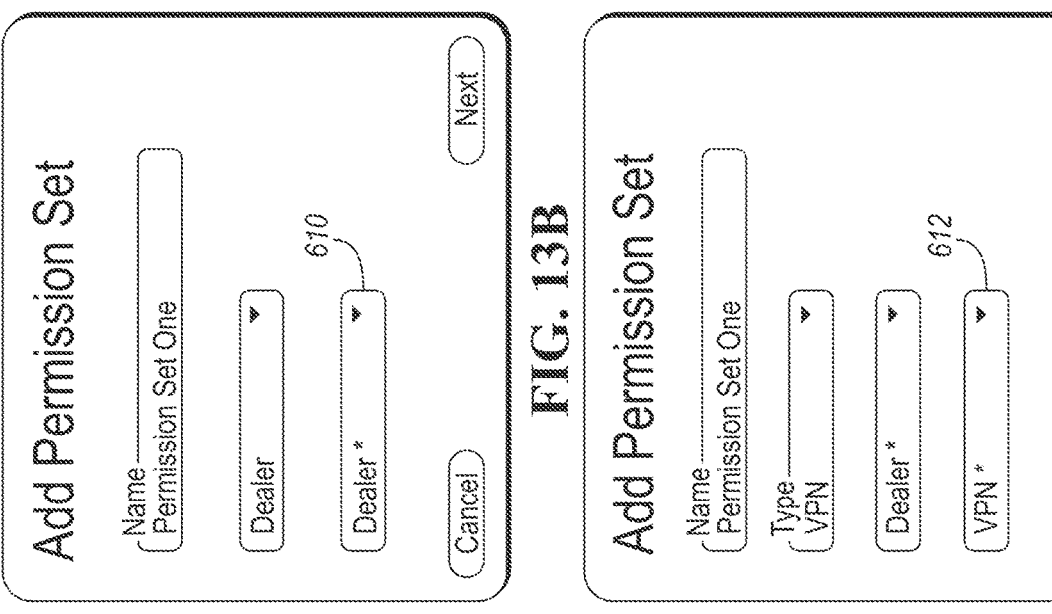

17 embodiments disclosed herein. GUI 600 may be displayed upon selecting add permissions button 502 from GUI 500. GUI 600 includes a name field 602 configured to receive input of a permission set name and a permission type drop down menu 604 configured to obtain a permission type for the added permission set. GUI 600 also includes a cancel button configured to cancel the name entered into the name field 602 and the permission type entered into drop down menu 604. GUI 600 also includes finish button 608 configured to save the added permission set with the permission type information entered through FIGS. 13B, 13C, and 13D. FIG. 13B is displayed when the permission type dealer is selected. Dealer drop down menu 610 is then displayed so a window is displayed with a search field configured to search for dealer names entered into the system. A dealer name from the dealer names returned by the search may be selected using a radio button. FIG. 13C is displayed when the permission type VPN is selected. VPN drop down menu 612 is then displayed so a window is displayed with the possible choices for VPN name for selection by a user. FIG. 13D is displayed when permission type VPN/user is selected. User drop down menu 614 is then displayed so a window is displayed with the possible choices for user name for selection by a user. FIG. 13E depicts checkboxes and associated toggle buttons. A checkbox may be associated with a tag or characteristic associated with a permission set and the associated toggle button may be used to associate a value with the tag or characteristic. FIG. 13F depicts the possible choices when type drop down box 604 is selected through GUI 600.

The following application is related to the present application: U.S. patent application Ser. No. 18/105,585 filed on Feb. 3, 2023, now U.S. Pat. No. 11,895,091 which issued on Feb. 6, 2024.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Any combination of computer-readable media may be utilized to implement the systems and processes of any embodiment disclosed herein. Computer-readable media may be a computer-readable signal medium and/or a computer-readable storage medium. A computer-readable storage medium may include any suitable tangible medium that can contain or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device. Program code embodied on a computer-readable medium may be transmitted using any appropriate medium, including but not limited to wireless, optical fiber cable, RF, and/or the like, and/or any suitable combinations thereof. Computer program code for carrying out operations for aspects of the systems described herein may be written in one or any combination of programming language such as Linux, Java, Smalltalk, C++, and conventional procedural programming languages, such as C. Mobile apps may be developed using any suitable language, including those previously mentioned, as well as Objective-C, Swift, c #, and HTML5.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer readable medium having non-transitory memory for storing machine instructions that are to be executed by one or more computers, the machine instructions when executed by the one or more computers implement the following functions:

transmitting, at a proxy consumer, a network interface owner request in response to a proxy application programming interface (API) starting the proxy consumer associated with a proxy;

transmitting, at the proxy consumer, a proxy request having layer 7 instructions in response to the proxy API starting the proxy consumer associated with the proxy, the proxy request is configured to request a proxy, the proxy is a real time streaming protocol (RTSP) proxy, a session initiation protocol (SIP) proxy, or a HyperText Transfer Protocol (HTTP) proxy;

receiving, at the proxy consumer, data after the transmitting the network interface owner request and the proxy request functions are performed; and performing one or more virtual private network (VPN) endpoint functions to generate one or more VPN identifications (IDs), tokens, internet protocol (IP) addresses, and ports based on a network management data functions table.

2. The computer readable medium of claim 1, wherein the network interface owner request is transmitted to a router API.

3. The computer readable medium of claim 1, wherein the proxy is the HyperText Transfer Protocol (HTTP) proxy.

4. The computer readable medium of claim 1, wherein the proxy request is transmitted to a local router.

5. The computer readable medium of claim 1, wherein the proxy is the real time streaming protocol (RTSP) proxy.

6. The computer readable medium of claim 5, wherein the RTSP proxy is a software application configured to receive RTSP streams.

7. The computer readable medium of claim 6, wherein the RTSP streams include video clips and video streams.

8. The computer readable medium of claim 1, wherein the proxy is the session initiation protocol (SIP) proxy.

9. The computer readable medium of claim 8, wherein the SIP proxy is configured to manage SIP calls within a network.

10. A computer readable medium having non-transitory memory for storing machine instructions that are to be executed by one or more computers, the machine instructions when executed by the one or more computers implement the following functions:

transmitting, at a proxy consumer, a network interface owner request in response to a proxy application programming interface (API) starting the proxy consumer associated with a proxy;

transmitting, at the proxy consumer, a proxy request having layer 7 instructions in response to the proxy API starting the proxy consumer associated with the proxy, the proxy request is configured to request a proxy, the proxy is a real time streaming protocol (RTSP) proxy, a session initiation protocol (SIP) proxy, or a HyperText Transfer Protocol (HTTP) proxy;

receiving, at the proxy consumer, data after the transmitting the network interface owner request and the proxy request functions are performed; and maintaining scalable virtual private networks (VPNs) through one or more data functions tables including a network management data functions table, a network description data functions table, a network list data functions table, a network user data functions table, and a user data functions table.

11. The computer readable medium of claim 10, wherein the transmitting the network interface owner request and the proxy request functions are performed simultaneously.

12. The computer readable medium of claim 10, wherein the transmitting the proxy request function is performed after the transmitting the network interface owner request function.

13. The computer readable medium of claim 10, wherein the proxy is the real time streaming protocol (RTSP) proxy.

14. The computer readable medium of claim 13, wherein the RTSP proxy is a software application configured to receive RTSP streams.

15. A computer readable medium having non-transitory memory for storing machine instructions that are to be executed one or more computers of a local network, the machine instructions when executed by a proxy consumer implement the following functions to create one or more connections between the one or more computers and one or more servers:

transmitting, at the proxy consumer, a network interface owner request in response to a proxy application programming interface (API) starting the proxy consumer associated with a proxy;

transmitting, at the proxy consumer, a proxy request having layer 7 instructions in response to the proxy API starting the proxy consumer associated with the proxy, the proxy request is configured to request a proxy, the proxy is a real time streaming protocol (RTSP) proxy, a session initiation protocol (SIP) proxy, or a HyperText Transfer Protocol (HTTP) proxy;

receiving, at the proxy consumer, data from the server after the transmitting the network interface owner request and the proxy request functions are performed; and receiving data in a network management data functions table from a router/firewall platform to generate one or more VPN identifications (IDs), tokens, internet protocol (IP) addresses, and ports from one or more virtual private network (VPN) endpoint functions.

16. The computer readable medium of claim 15, wherein the resources include one or more applications.

17. The computer readable medium of claim 15, wherein the data is transmitted from a local router to the proxy consumer.

18. The computer readable medium of claim 15, wherein the functions further include transmitting target content to the proxy API, the target content includes data transmitted from a protected device to a remote router.

19. The computer readable medium of claim 15, wherein the proxy is the real time streaming protocol (RTSP) proxy.

20. The computer readable medium of claim 19, wherein the RTSP proxy is a software application configured to receive RTSP streams.

\* \* \* \* \*